(12) United States Patent
Oki et al.

(10) Patent No.: US 10,059,275 B2
(45) Date of Patent: Aug. 28, 2018

(54) ROOF MOLDING CAP ATTACHMENT STRUCTURE AND ROOF MOLDING

(71) Applicant: KATAYAMA KOGYO CO., LTD., Ibara-Shi (JP)

(72) Inventors: Shingo Oki, Okayama (JP); Daiki Kawamoto, Fukuyama (JP)

(73) Assignee: Katayama Kogyo Co., Ltd., Ibara-Shi (JP)

( * ) Notice: Subject to any disclaimer, the term of this patent is extended or adjusted under 35 U.S.C. 154(b) by 0 days.

(21) Appl. No.: 15/053,324

(22) Filed: Feb. 25, 2016

(65) Prior Publication Data
US 2016/0250980 A1    Sep. 1, 2016

(30) Foreign Application Priority Data
Feb. 27, 2015  (JP) .................. 2015-037644

(51) Int. Cl.
| | |
|---|---|
| B60R 9/04 | (2006.01) |
| B60R 9/058 | (2006.01) |
| B65D 43/16 | (2006.01) |
| B65D 43/20 | (2006.01) |
| B60R 13/04 | (2006.01) |

(52) U.S. Cl.
CPC .............. B60R 9/058 (2013.01); B60R 13/04 (2013.01); B65D 43/164 (2013.01); B65D 43/20 (2013.01)

(58) Field of Classification Search
CPC ........... B60R 9/04; B60R 9/058; B60R 13/04; B65D 43/16; B65D 43/163; B65D 43/164; B65D 43/20
See application file for complete search history.

(56) References Cited

U.S. PATENT DOCUMENTS

| | | | | |
|---|---|---|---|---|
| 572,217 A | * | 12/1896 | Rebmann ............. | B65D 43/164 16/362 |
| 1,526,213 A | * | 2/1925 | Humphrey ............ | B65D 43/20 144/285 |
| 3,746,206 A | * | 7/1973 | Utz ...................... | B65D 43/164 220/214 |
| 4,165,827 A | * | 8/1979 | Bott ......................... | B60R 9/04 224/326 |

(Continued)

FOREIGN PATENT DOCUMENTS

| | | | | |
|---|---|---|---|---|
| DE | 3917166 A1 | * | 3/1990 | ............. A45C 11/24 |
| DE | 102013021361 A1 | * | 6/2015 | ........... B65D 43/169 |

(Continued)

*Primary Examiner* — D Glenn Dayoan
*Assistant Examiner* — Paul Chenevert
(74) *Attorney, Agent, or Firm* — Burr & Brown, PLLC (57) ABSTRACT

A roof molding cap attachment structure includes a cap member, and an attachment member that attaches the cap member to a roof molding having a first opening, the attachment member including a support pin that rotatably supports the cap member between the first position where the cap member closes the first opening of the roof molding and a second position where the cap member discloses the first opening, the cap member including a rotary guide that guides the cap member to rotate along the support pin, and the cap member being adapted to be pushed forward to an inside of the roof molding when the cap member has been rotated to the second position.

6 Claims, 8 Drawing Sheets

(56) References Cited

U.S. PATENT DOCUMENTS

| | | | | |
|---|---|---|---|---|
| 4,170,322 A | * | 10/1979 | Bott | B60Q 1/2661 224/326 |
| 4,282,983 A | * | 8/1981 | Swartzbaugh | B65D 43/164 16/227 |
| 6,186,357 B1 | * | 2/2001 | Kyle | B65D 43/164 16/355 |
| 6,196,405 B1 | * | 3/2001 | Kambouris | B65D 43/164 206/701 |
| 6,564,433 B2 | * | 5/2003 | Nagasawa | B60R 13/04 24/289 |
| 6,974,181 B2 | | 12/2005 | Mikkaichi et al. | |
| 7,140,511 B2 | * | 11/2006 | Baker | B65D 43/20 206/701 |
| 7,296,849 B2 | | 11/2007 | Tremmel et al. | |
| 8,511,510 B2 | * | 8/2013 | Pratte | A61L 2/26 16/359 |
| 2003/0038510 A1 | * | 2/2003 | Yoon | B60R 9/04 296/210 |
| 2004/0000030 A1 | * | 1/2004 | Pleiman | A45C 13/005 16/267 |
| 2015/0239622 A1 | * | 8/2015 | Jian | B65D 43/20 220/813 |

FOREIGN PATENT DOCUMENTS

| | | | | |
|---|---|---|---|---|
| JP | 06-057749 U | | 8/1994 | |
| JP | 06-072753 U | | 10/1994 | |
| JP | 06-074521 U | | 10/1994 | |
| JP | 2004-224232 A1 | | 8/2004 | |
| JP | 2005-029010 A1 | | 2/2005 | |
| JP | 2006-507980 A1 | | 3/2006 | |
| KR | 100786889 B1 | * | 12/2007 | B60R 13/04 |

\* cited by examiner

CROSS-SECTIONAL VIEW TAKEN ALONG LINE A-A

ROOF MOLDING CAP ATTACHMENT STRUCTURE AND ROOF MOLDING

CROSS REFERENCE TO RELATED APPLICATION

Japanese Patent Application No. 2015-037644 filed on Feb. 27, 2015, is hereby incorporated by reference in its entirety.

TECHNICAL FIELD

The present invention relates to a cap structure that is fitted to a roof molding fitted to a groove formed in the roof of a vehicle (automobile), the cap structure providing the roof molding with an opening for securing accessories (e.g., carrier), and capable of closing the opening.

BACKGROUND ART

A roof molding cap attachment structure in which the cap is removably fitted to the roof molding, and a roof molding cap attachment structure in which the cap is fitted to the roof molding so as to be slidable in the longitudinal direction are known. However, these roof molding cap attachment structures have a problem in that the cap may be lost, or it may be impossible to form a slide space in the longitudinal direction. In view of such a situation, a roof molding cap attachment structure in which the cap can be rotate (opened and closed) in the vertical direction has been proposed (see JP-UM-A-6-57749).

The cap structure disclosed in JP-UM-A-6-57749 has a lid and a frame for attaching the lid to a roof molding, wherein the lid has shafts that make a pair and are provided on either side in the longitudinal direction, and the frame has a guide groove for guiding the shaft in the vertical direction. The cap structure disclosed in JP-UM-A-6-57749 has a problem in that the shaft of the lid may unintentionally move downward along the guide groove, whereby the lid may be opened or removed inadvertently.

SUMMARY OF THE INVENTION

Technical Problem

An object of the invention is to provide a roof molding cap attachment structure that includes a small number of parts, can be easily opened and closed in a state in which the cap attachment structure is fitted to a roof molding, ensures high operation stability; and can save the installation space, and a roof molding using the roof molding cap attachment structure.

Solution to Problems

According to one aspect of the invention, a roof molding cap attachment structure includes:

a cap member; and an attachment member that attaches the cap member to a roof molding having a first opening, the attachment member including a support pin that rotatably supports the cap member between the first position where the cap member closes the first opening of the roof molding and a second position where the cap member discloses the first opening, the cap member including a rotary guide that guides the cap member to rotate along the support pin, and the cap member being adapted to be pushed forward to an inside of the roof molding when the cap member has been rotated to the second position.

According to this configuration, since the cap member is not pushed into the roof molding until the cap member is rotated by a given angle at which the cap member discloses the first opening of the roof molding, a situation in which the cap member unintentionally opens does not occur, differing from the cap structure disclosed in JP-UM-A-6-57749.

The roof molding cap attachment structure is configured so that the removal of the cap member from the support pin of the attachment member occurs when the cap member has been rotated to the second position. For example, the ends of the cap member may be supported by round support pins that make a pair and are provided to the attachment member, and the removal from the support pins may occur when the cap member has been rotated to the second position.

In the invention, the rotary guide has a second opening that allows removal of the rotary guide from the support pin when the cap member has been rotated to the second position, and the cap member may include a slide guide that guides movement of the cap member in a direction forward to the inside of the roof molding after the removal of the rotary guide has occurred.

According to this configuration, the cap member is rotated and supported along the support pin through the rotary guide, and the pushing direction of the cap member becomes stable.

In the invention, a cap member may include a stopper that limits an amount of movement due to a push.

According to this configuration, the pushing position of the cap member becomes stable.

A slide guide of the cap member may have a cut that allows the support pin of the attachment member to pass through.

The invention is characterized in that the cap member does not move in a direction forward to the inside of the roof molding until the cap member is opened by a given angle. An arbitrary means may be used to achieve this feature.

For example, the support pin of the attachment member may include a wide part that is wider than the open dimension of second the opening of the rotary guide of the cap member, and a narrow part that is narrower than the open dimension of the opening.

The wide part and the narrow part of the support pin may be formed by forming the support pin to have an oval cross section, or flatly removing part of the outer circumferential surface of a column, for example.

A clip or the like is required to attach a roof molding to a vehicle. According to the invention, since the cap member is not slid in the longitudinal direction, the limitations to the position of the clip or the like can be reduced.

Advantageous Effects of Invention

Since the cap attachment structure according to the invention is designed so that the cap member cannot be pushed into the roof molding until the cap member is rotated by a given angle, the cap attachment structure has excellent open-close stability. Moreover, it suffices to use a small number of parts. Since the cap member is received in the inner space of the roof molding (fitting groove), it is possible to save the installation space, and achieve a reduction in size.

DESCRIPTION OF EMBODIMENTS

An example of a roof molding cap attachment structure according to an exemplary embodiment of the invention is described below with reference to the drawings. Note that the invention is not limited thereto.

Figure 1A:
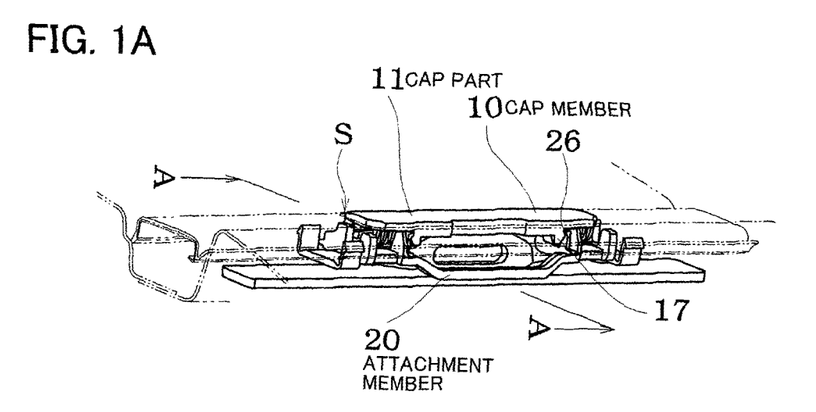
FIG. 1A is a view illustrating a state in which the cap member closes the opening (first opening) S of the roof molding(first position)
Figure 1B:
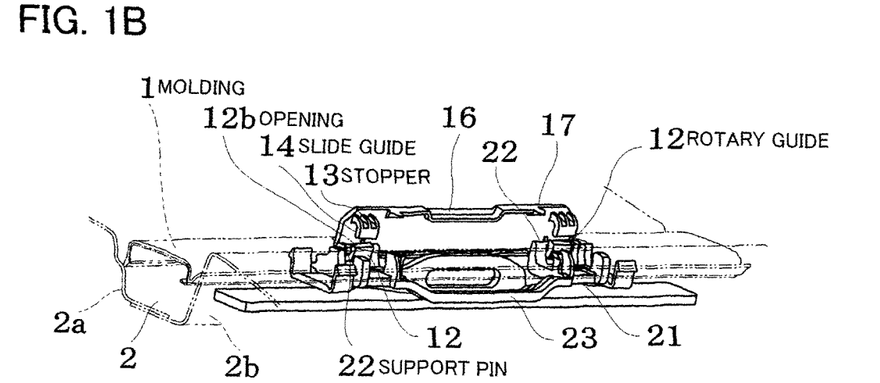
FIG. 1B is a view illustrating a state in which the cap member has been rotated to stand at a given angle (second position)
Figure 1C:
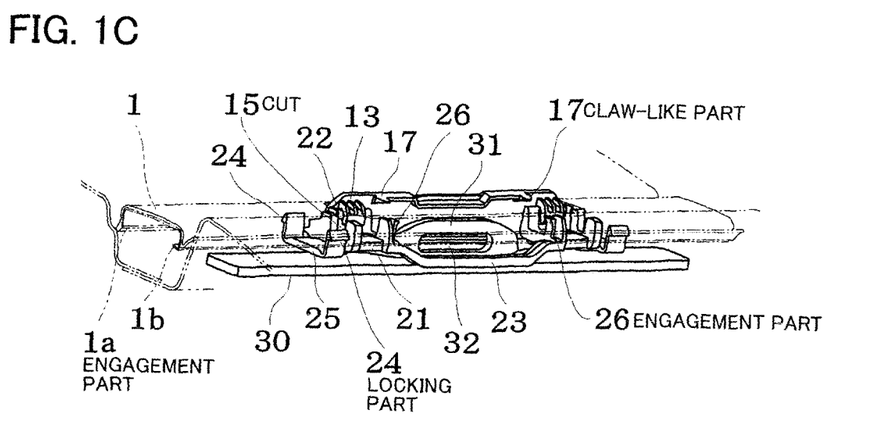
FIG. 1C is a view illustrating a state in which the cap member has been pushed into the roof molding.
Figure 2A:
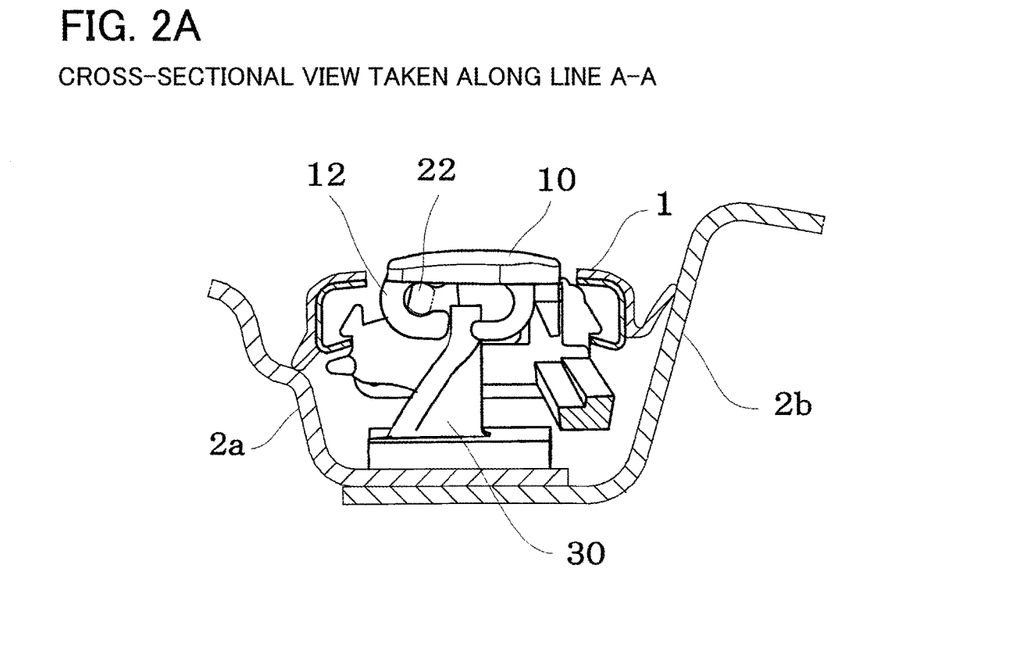
FIG. 2A is a cross-sectional view taken along the line A-A illustrated in FIG. 1A.
Figure 2B:
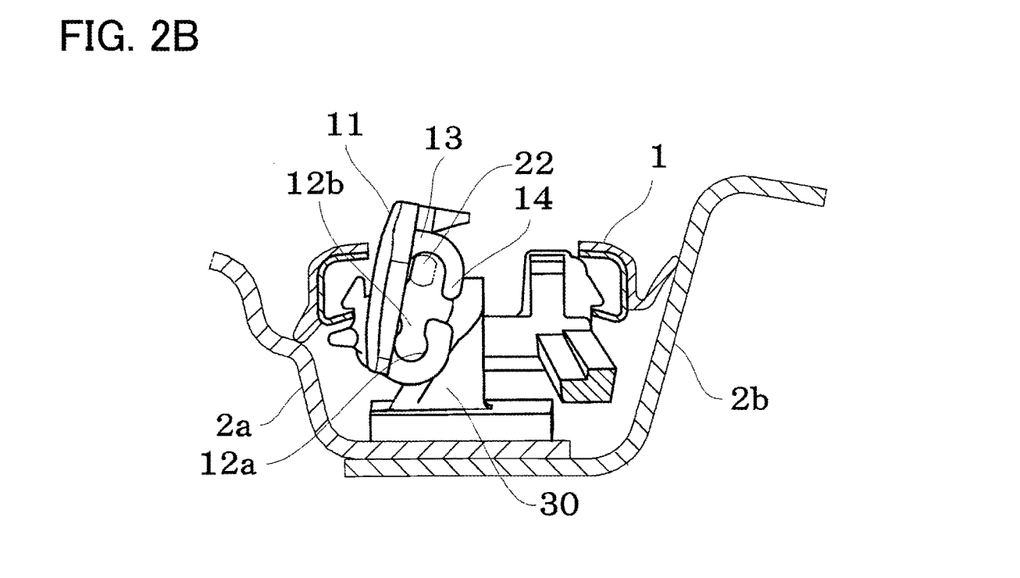
FIG. 2B is a view illustrating a state in which the cap member has been opened and pushed downward (third position).

As illustrated in FIGS. 1A to 1C, a roof molding 1 is fitted to a groove 2 that is formed in the roof of a vehicle and extends in the forward-backward direction.

In one embodiment of the invention, the groove 2 is defined by a roof panel 2a and a side panel 2b (see the two-dot chain line illustrated in FIG. 1B).

A fixture 30 for securing accessories (e.g., roof carrier) is provided to the groove 2 formed in the roof (see FIG. 1C).

Figure 9:
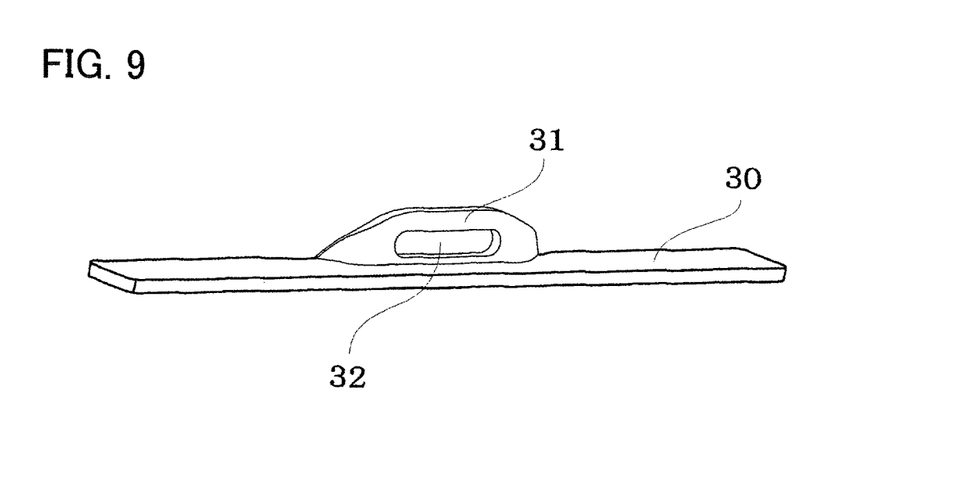
FIG. 9 is a view illustrating an example of the fixture of the roof carrier.

In one embodiment of the invention, the fixture 30 includes a base that is secured on the vehicle (e.g., by welding or use of a bolt), a securing piece 31 that is provided on the base, and a securing hole 32 that is formed in the securing piece 31 (see FIG. 9). Note that the fixture 30 is not particularly limited.

A cap member 10 functions as a lid that opens an opening (first opening) S (that is formed corresponding to the position of the fixture 30) formed in the roof molding 1 when accessories (e.g., roof carrier) are secured on the vehicle, and closes the opening S when accessories are not secured on the vehicle.

The cap attachment structure according to one embodiment of the invention includes an attachment member 20 that engages with the opening S of the roof molding 1, and the cap member 10 that is rotatably fitted to the attachment member 20.

Figure 3:
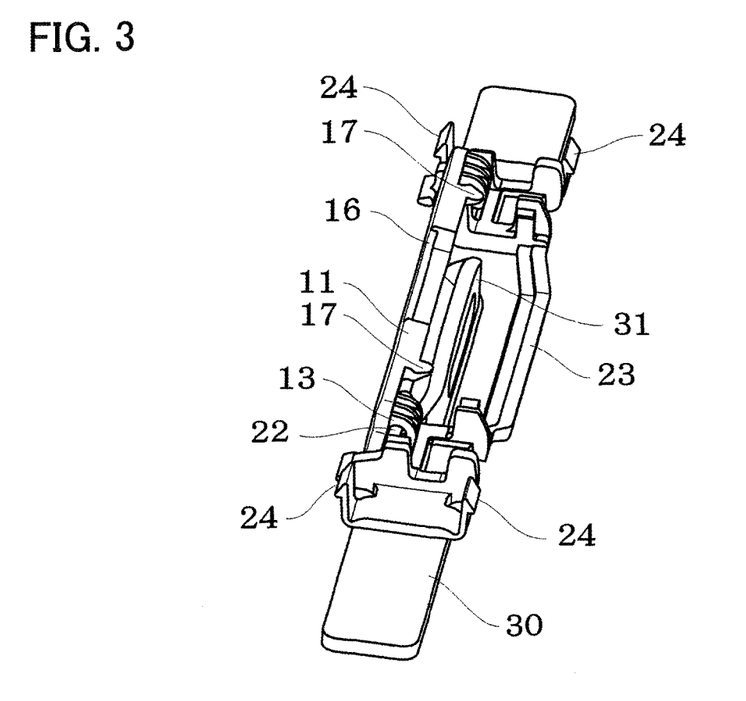
FIG. 3 is a top perspective view illustrating a state in which the cap member has been opened (second position).
Figure 8A:
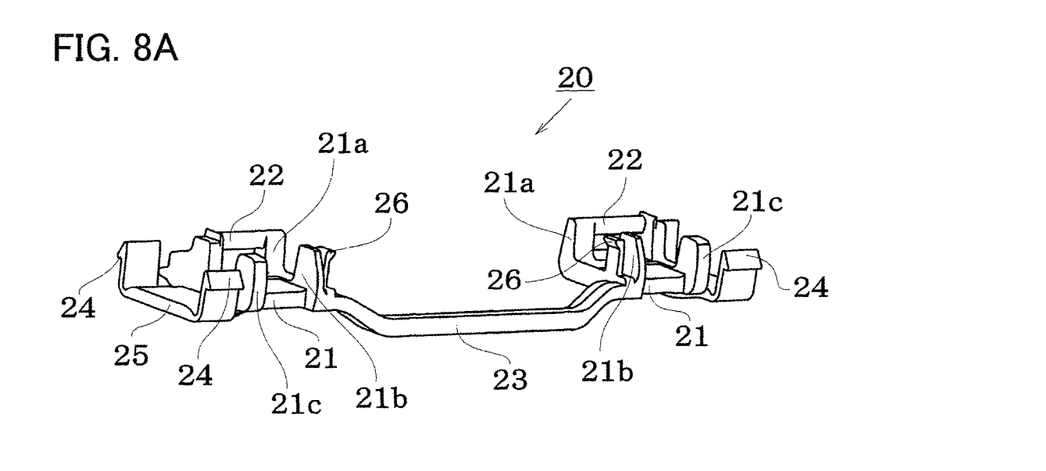
FIG. 8A is a side perspective view illustrating the attachment member.
Figure 8B:
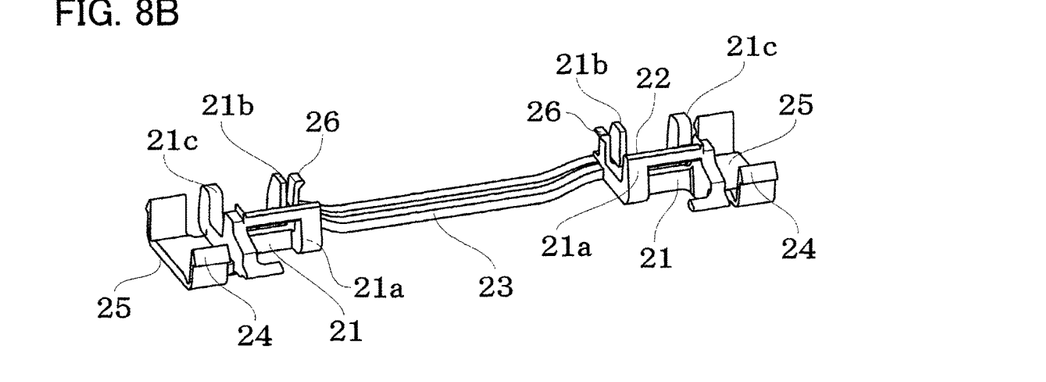
FIG. 8B is a top perspective view illustrating the attachment member.
Figure 8C:
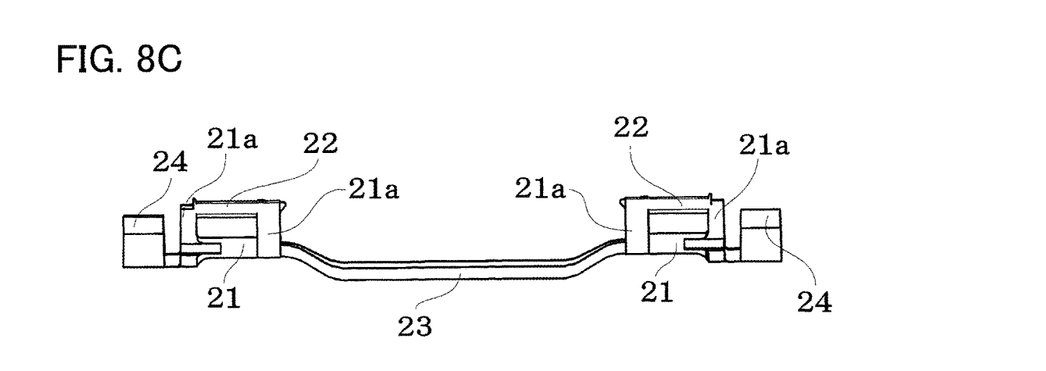
FIG. 8C is a side view illustrating the attachment member.

As illustrated in FIGS. 8A to 8C, the attachment member 20 has a structure in which bottom parts 21 that make a pair are connected through a link 23 to provide support pins 22 that make a pair, for example. As illustrated in FIG. 3 (illustrating a state in which the cap member 10 is opened), the support pins 22 that make a pair are provided to the attachment member 20 on either side in the longitudinal direction of the fixture 30 (i.e., in the forward-backward direction of the vehicle).

As illustrated in FIG. 8C, two supports 21a are provided vertically on the bottom part 21, and the support pin 22 is provided between the supports 21a.

The support pin 22 rotatably supports the cap member 10 (as described later) between the first position (FIG. 5A) where the cap member 10 closes the opening S of the roof molding 1 and a second position (FIG. 5B) where the cap member 10 discloses the opening S. The support pin 22 may be appropriately formed as long as the support pin 22 can rotatably support the cap member 10.

In one embodiment of the invention, receiving walls 21b and 21c that make a pair are provided vertically on the bottom part 21, and a stopper 13 and a slide guide 14 of the cap member 10 are received between the receiving walls 21b and 21c.

The attachment member 20 includes claw-like locking parts 24 that can undergo elastic deformation, and engage with engagement parts 1a and 1b that are provided to the roof molding 1 (having an approximately inverted channel-like cross-sectional shape) on either side in the widthwise direction. In one embodiment of the invention, the locking parts 24 are provided vertically on a side part 25 so as to form an approximately C-like cross-sectional shape.

Figure 10:
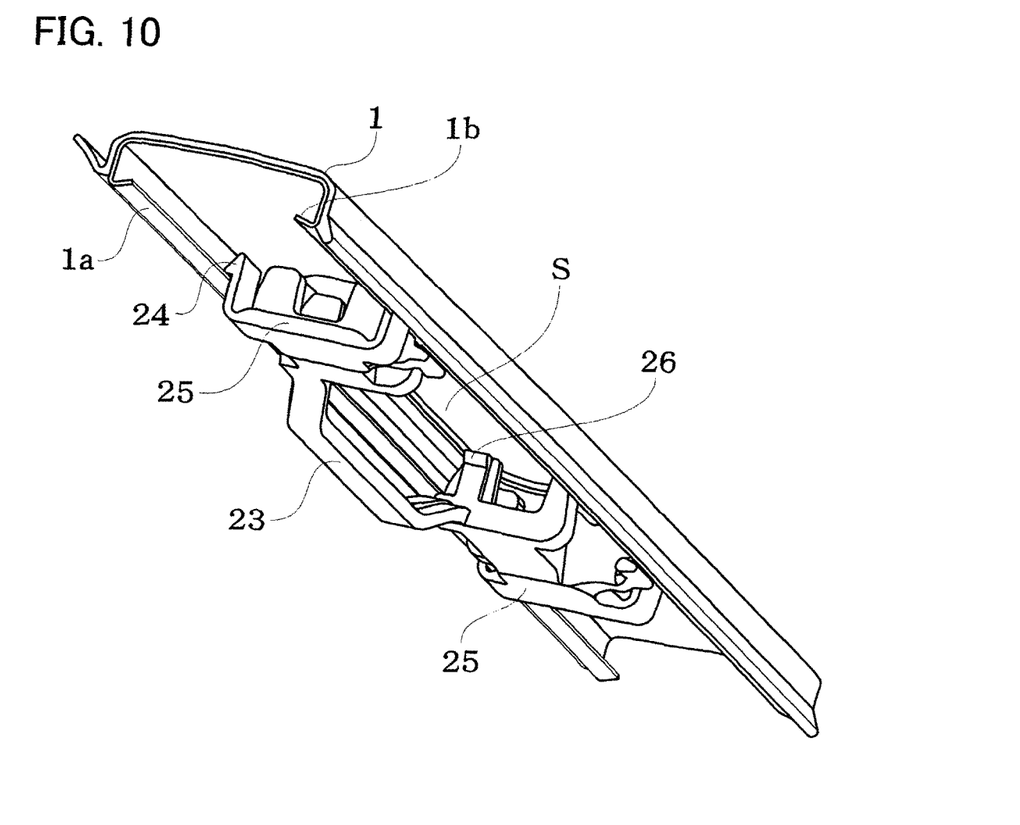
FIG. 10 is a bottom perspective view illustrating a state in which the cap member has been fitted to the opening S of the roof molding using the attachment member.

FIG. 10 illustrates a state in which the attachment member 20 is fitted to the roof molding 1.

The attachment member 20 includes an engagement part 26 that holds the cap member 10 in a closed state.

Figure 4:
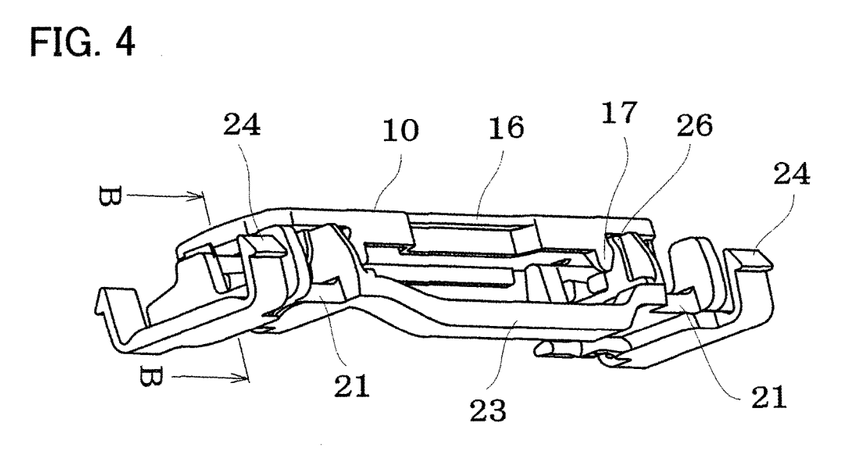
FIG. 4 is a view illustrating a state in which the cap member fitted to the attachment member has been closed (first position).
Figure 7A:
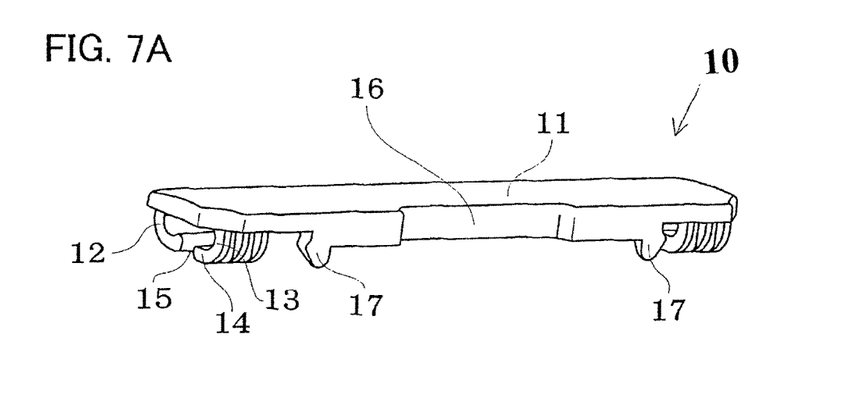
FIG. 7A is a side perspective view illustrating the cap member.
Figure 7B:
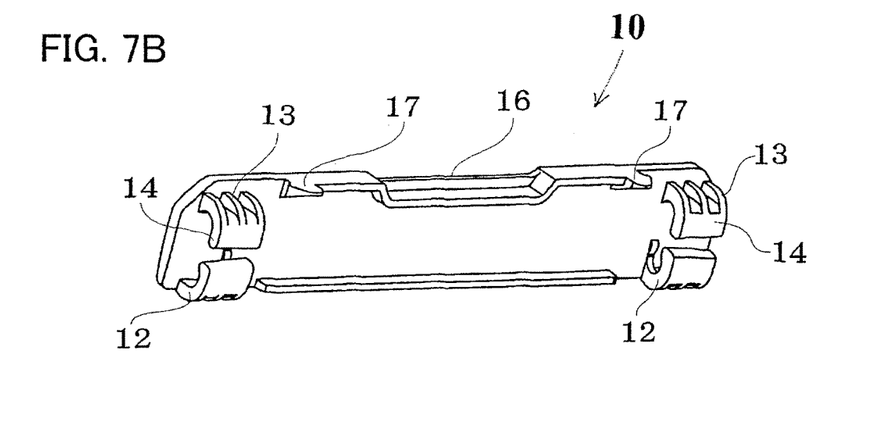
FIG. 7B is a bottom perspective view illustrating the cap member.
Figure 7C:
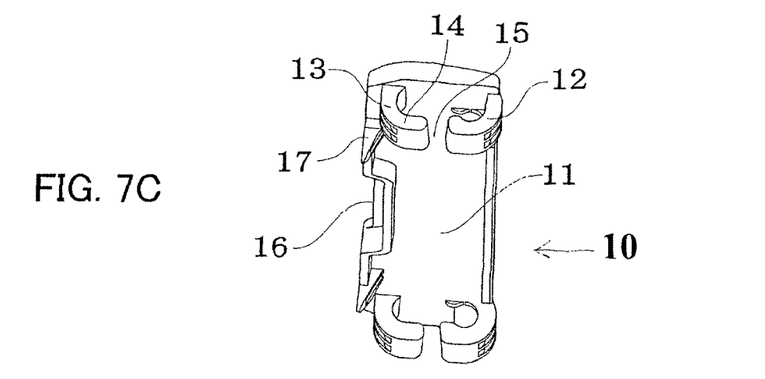
FIG. 7C is a bottom perspective view illustrating the cap member at an angle differing from that of FIG. 7B.

FIGS. 7A to 7C illustrate the cap member 10, and FIG. 4 illustrates a state in which the cap member 10 is fitted to the attachment member 20.

FIG. 1A illustrates a state in which the cap member 10 (in an approximately horizontal state (closed state)) closes the opening S of the roof molding 1, FIG. 1B illustrates a state in which the cap member 10 has been opened so as to approximately stand upright, and FIG. 1C illustrates a state in which the cap member 10 has been pushed downward (i.e., in an approximately vertically downward direction) so as to enter the roof molding 10.

Figure 5A:
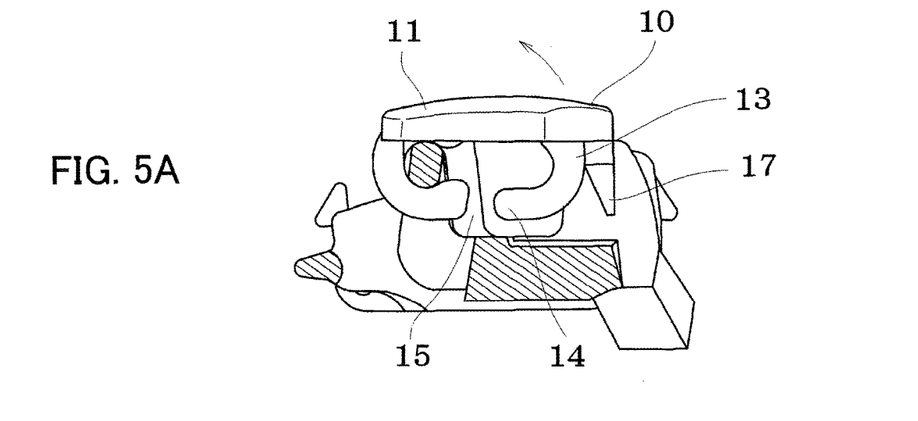
FIG. 5A is a cross-sectional view (taken along the line B-B illustrated in FIG. 4) illustrating a first position in which the cap member is closed.
Figure 5B:
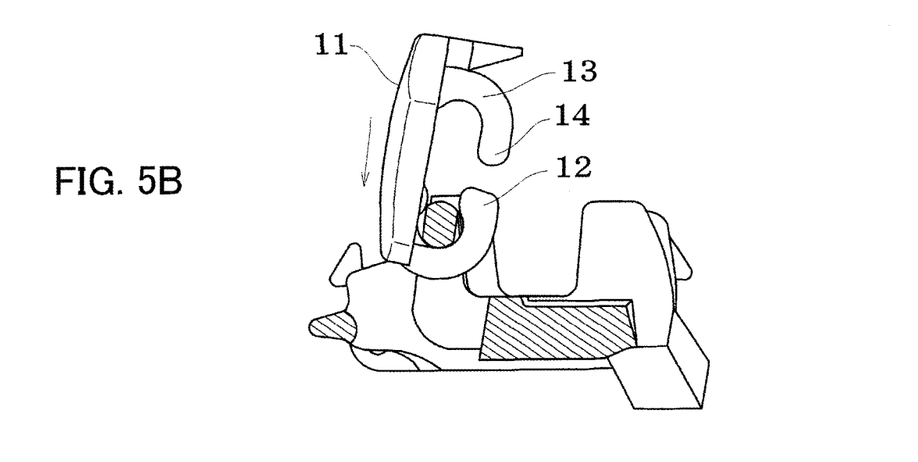
FIG. 5B is a cross-sectional view (taken along the line B-B illustrated in FIG. 4) illustrating a second position in which the cap member has been rotated by a given angle around the support pins that are provided on either side in the longitudinal direction.
Figure 5C:
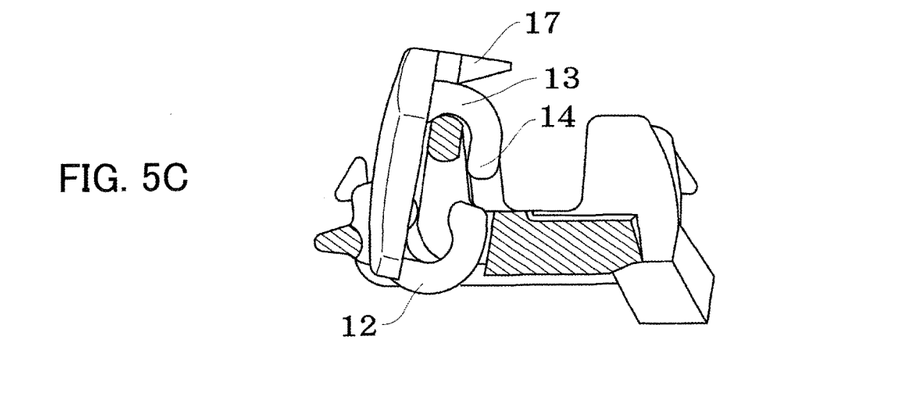
FIG. 5C is a cross-sectional view (taken along the line B-B illustrated in FIG. 4) illustrating a third position in which the cap member has been pushed into the roof molding.

FIGS. 5A to 5C are partial cross-sectional views that respectively correspond to FIGS. 1A to 1C, and FIGS. 8A to 8C illustrate the dimensional relationship between the support pin 22 and a rotary guide 12.

The cap member 10 includes a cap part 11 that has the same shape as the opening S of the roof molding 1, and the rotary guide 12 that is provided on the back side of the cap part 11, and pivotally attached to the support pin 22 of the attachment member 20.

Figure 6A:
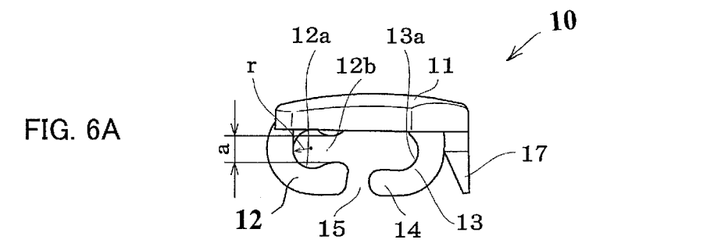
FIGS. 6A and 6B are views illustrating the dimensional relationship between the rotary guide of the cap member and the support pin of the attachment member.

As illustrated in FIG. 6A, the rotary guide 12 includes an arc-shaped part 12a having a radius r, and an opening (second opening) 12b having an open dimension a.

Figure 6B:
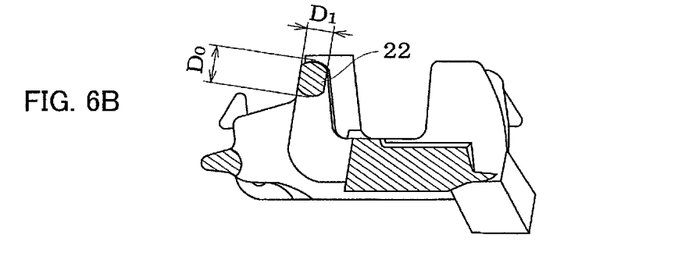

As illustrated in FIG. 6B, the support pin 22 of the attachment member 20 has a flat part that is formed by flatly removing each side of a column having a diameter $D_0$ that is slightly smaller than the value "r×2".

The diameter $D_0$ is larger than the dimension a of the opening 12b of the rotary guide, and corresponds to a wide part, and the thickness $D_1$ of the flat part is smaller than the dimension a, and corresponds to a narrow part.

Therefore, the cap member 10 can be moved in the direction indicated by the arrow illustrated in FIG. 5B (i.e., in an approximately vertically downward direction) by rotating the cap member 10 by a given angle so that the narrow part having the thickness $D_1$ that is smaller than the dimension a of the opening 12b is fitted into the opening 12b.

When the cap member 10 is moved as described above, the slide guide 14 limits the moving direction, and an inner circumferential surface 13a of the stopper 13 comes in contact with the support pin 22 to limit the pushing amount.

Note that a cut 15 that is formed by removing part of the slide guide 14 is required when fitting the cap member 10 to the support pin 22.

It is thus possible to achieve the state illustrated in FIG. 1A in which the cap member 10 closes the opening S, and the state illustrated in FIG. 1C in which the cap member 10 has been opened, pushed into the roof molding 1 (in an approximately vertically downward direction), and received inside the roof molding 1.

In one embodiment of the invention, a finger placement part 16 is provided on the free end side of the cap member 10 in order to facilitate the open-close operation.

A claw-like part 17 engages with the engagement part 26 of the attachment member 20 in a state in which the cap member 10 is closed.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A roof molding cap attachment structure comprising:
    a cap member; and
    an attachment member that attaches the cap member to a roof molding having a first opening,
    the attachment member including a support pin that rotatably supports the cap member between the first position where the cap member closes the first opening of the roof molding and a second position where the cap member discloses the first opening,
    the cap member including a rotary guide that guides the cap member to rotate along the support pin,
    the cap member being adapted to be pushed forward to an inside of the roof molding when the cap member has been rotated to the second position,
    the rotary guide having a second opening that allows removal of the rotary guide from the support pin when the cap member has been rotated to the second position,
    the cap member including a slide guide that guides movement of the cap member in a direction forward to the inside of the roof molding after the removal of the rotary guide has occurred, and
    the support pin of the attachment member including a wide part that is wider than an open dimension of the second opening of the rotary guide of the cap member, and a narrow part that is narrower than the open dimension of the second opening.

2. The roof molding cap attachment structure as defined in claim 1,
    wherein the cap member includes a stopper that limits an amount of movement due to a push.

3. The roof molding cap attachment structure as defined in claim 1,
    wherein the slide guide of the cap member has a cut that allows the support pin of the attachment member to pass through.

4. A roof molding comprising the roof molding cap attachment structure as defined in claim 1.

5. The roof molding cap attachment structure as defined in claim 1, wherein the attachment member includes a pair of supports to which both ends of the support pin are connected.

6. The roof molding cap attachment structure as defined in claim 1, wherein the rotary guide and slide guide are provided at either side of the cap member in a longitudinal direction and set to a face-to-face relationship in a transverse direction.

* * * * *